United States Patent
Qian et al.

(10) Patent No.: US 12,267,456 B2
(45) Date of Patent: Apr. 1, 2025

(54) METHOD FOR OPERATING A DEVICE FOR HANDLING A PHONE CALL

(71) Applicant: Orange, Issy-les-Moulineaux (FR)

(72) Inventors: Kun Qian, Beijing (CN); Zhihong Guo, Beijing (CN)

(73) Assignee: Orange, Issy-les-Moulineaux (FR)

( * ) Notice: Subject to any disclaimer, the term of this patent is extended or adjusted under 35 U.S.C. 154(b) by 15 days.

(21) Appl. No.: 18/008,098

(22) PCT Filed: Jun. 25, 2021

(86) PCT No.: PCT/IB2021/000428
§ 371 (c)(1),
(2) Date: Dec. 2, 2022

(87) PCT Pub. No.: WO2022/003415
PCT Pub. Date: Jan. 6, 2022

(65) Prior Publication Data
US 2023/0275990 A1    Aug. 31, 2023

(30) Foreign Application Priority Data
Jun. 29, 2020   (WO) ............... PCT/CN2020/098743

(51) Int. Cl.
*H04M 3/42* (2006.01)
(52) U.S. Cl.
CPC ............................... *H04M 3/42017* (2013.01)
(58) Field of Classification Search
None
See application file for complete search history.

(56) References Cited

U.S. PATENT DOCUMENTS

| | | | |
|---|---|---|---|
| 8,478,246 B2 | 7/2013 | Wang et al. | |
| 2005/0265318 A1 | 12/2005 | Khartabil et al. | |
| 2006/0291639 A1 | 12/2006 | Radziewicz et al. | |
| 2007/0127655 A1 | 6/2007 | Jung et al. | |
| 2007/0294425 A1* | 12/2007 | Sobti ................. | H04M 3/02 709/246 |

(Continued)

FOREIGN PATENT DOCUMENTS

| | | |
|---|---|---|
| CN | 102056249 A | 5/2011 |
| CN | 106101381 A | 11/2016 |

(Continued)

OTHER PUBLICATIONS

International Search Report for International Patent Application No. PCT/IB2021/000428 dated Oct. 25, 2021.

(Continued)

*Primary Examiner* — Quoc D Tran
(74) *Attorney, Agent, or Firm* — Knobbe, Martens, Olson & Bear, LLP

(57) ABSTRACT

A method for operating a device includes the following, performed by a processing unit of the device: receiving a message signaling an incoming phone call from a calling party via a server; generating a ringing message including at least one additional parameter specifying an enriched ring-back tone to be played, as a function of at least a status information available to the device; and transmitting the ringing message to the server for playing to the calling party the enriched ring-back tone.

12 Claims, 3 Drawing Sheets

(56) References Cited

U.S. PATENT DOCUMENTS

| | | | | |
|---|---|---|---|---|
| 2010/0066801 A1* | 3/2010 | Zhu | ................... | H04L 65/1043 |
| | | | | 379/87 |
| 2010/0080149 A1* | 4/2010 | Lee | ................. | H04M 3/42017 |
| | | | | 455/433 |
| 2011/0142222 A1* | 6/2011 | Yang | ................ | H04M 3/42093 |
| | | | | 379/207.16 |

FOREIGN PATENT DOCUMENTS

| | | |
|---|---|---|
| CN | 109120771 A | 1/2019 |
| EP | 2485530 A1 | 8/2012 |
| WO | WO 2020/026003 A1 | 2/2020 |

OTHER PUBLICATIONS

International Search Report for International Patent Application No. PCT/CN2020/098743 dated Mar. 25, 2021.

\* cited by examiner

METHOD FOR OPERATING A DEVICE FOR HANDLING A PHONE CALL

CROSS-REFERENCE TO RELATED APPLICATIONS

This application is filed under 35 U.S.C. § 371 as the U.S. National Phase of Application No. PCT/IB2021/000428 entitled "METHOD FOR OPERATING A DEVICE FOR HANDLING A PHONE CALL" and filed Jun. 25, 2021, and which claims priority to PCT/CN2020/098743 filed Jun. 29, 2020, each of which is incorporated by reference in its entirety.

BACKGROUND

Field

The field of this development is that of devices such as mobiles phones. More particularly, the development relates to a method for operating such a device when receiving a phone call from a calling party.

Description of the Related Technology

With devices such as mobile phones, a plurality of modes are available wherein an incoming call will not (or less visibly) be notified to the user (as designated here as the callee, or called party), such as "Do Not Disturb" mode (during a given time frame, all calls except emergency ones from a predetermined list of contacts will be totally silenced and the screen stays dark), "Driving" mode (or "Do Not Disturb while Driving" mode, which is the same as Do not Disturb but with a detection of driving motion) or just "mute" mode (all calls are silenced).

In other words, in these modes, a call is not rejected but the phone rings and the callee simply does not take the call (not realizing that he/she is being called).

The problem here is that the calling party usually does not understand why the callee does not take the call, although that might be interesting to know.

Currently, in order to provide information to the caller about the reason why the call is not taken by the callee, it is possible for instance in the "Do not Disturb" mode to set an "auto-reply" function. More precisely, the callee's phone may send back a pre-written text message (such as a SMS message) to the caller's phone, to explain that it is in "do not disturb" mode.

However, such an implementation has several issues. Among others the pre-written message may be missed by caller (the text message is often sent while the caller's phone is still ringing) and such a pre-written messages cannot reach a landline phone.

There is therefore a need for improving the user experience so as to ensure that any caller, irrespective of their phone, may be dynamically provided with information about a callee when the call is unsuccessful.

SUMMARY

For these purposes, the present development provides a method for operating a device characterized in that it comprises the following steps, performed by a processing unit of the device:
receiving (a) a message signaling an incoming phone call from a calling party via a server;
generating (b) a ringing message comprising at least one additional parameter specifying an enriched ring-back tone to be played, as a function of at least a status information available to said device; and
transmitting (c1) said ringing message to the server for playing to the calling party said enriched ring-back tone.

Preferred but non limiting features of the present development are as follow:
said ring-back tone is different from a default ring-back tone to be played by the server when receiving a default ringing message without said additional parameter, the enriched ring-back tone preferably reciting a piece of information regarding said status information;
the method further comprises, before transmitting (c1) said ringing message to the server, transmitting (c0) said default ringing message to the server for playing to the calling party said default ring-back tone;
transmitting (c1) said ringing message is performed if the device is still ringing at the expiration of a determined duration after the transmission (c0) of said default ringing message to the server.
Said ringing message is a 180 ringing message according to the Session Initiation Protocol, said at least one additional parameter being in particular inserted into a Alert-Info header field of the 180 ringing message.
Said status information available to said device comprises a status information of the device and wherein generating (b) the ringing message comprises identifying the status of the device, in particular among a determined list of possible status for the device.
Identifying the status of the device comprises verifying whether a particular notification mode of the device is set.
Said status information available to said device comprises information about the availability of a user of said device and wherein generating (b) the ringing message comprises determining the availability of the user of said device by accessing a calendar of said user.
Determining the availability of the user of said device comprises determining how much time is left until the next calendar item of said user, said time left being used as an additional parameter when generating (b) the ringing message.
Receiving (a) the phone call comprises determining identity information about the calling party, the ringing message being also generated (b) as a function of said identity information.
Generating (b) the ringing message comprises attempting to identify a contact of a user of said device from the determined identity information, the ringing message comprising at least one additional parameter being generated (b) when succeeding in identifying a contact of the user of said device.
The method comprises a further step, performed by a processing unit of the server, of playing (d) said enriched ring-back tone to the calling party.

In a second aspect, the development provides a device comprising a processing unit configured to implement the following steps, when the device receives a message signaling an incoming phone call from a calling party via a server:
generating a ringing message comprising at least one additional parameter specifying an enriched ring-back tone to be played, as a function of at least a status information available to said device (1); and transmitting said ringing message to the server (2) for playing to the calling party said enriched ring-back tone.

In a third aspect, the development provides a system comprising a device according to the second aspect and a server comprising a processing unit configured, when receiving said ringing message, to play the enriched ring-back tone to the calling party.

According to a fourth and a fifth aspects, the development provides a computer program product, comprising code instructions for executing a method according to the first aspect for operating a device; and a computer-readable medium, on which is stored a computer program product comprising code instructions for executing a method according to the first aspect for operating a device.

BRIEF DESCRIPTION OF THE DRAWINGS

The above and other objects, features and advantages of this development will be apparent in the following detailed description of an illustrative embodiment thereof, which is to be read in connection with the accompanying drawings wherein.

DETAILED DESCRIPTION OF CERTAIN ILLUSTRATIVE EMBODIMENTS

Architecture

Figure 1:
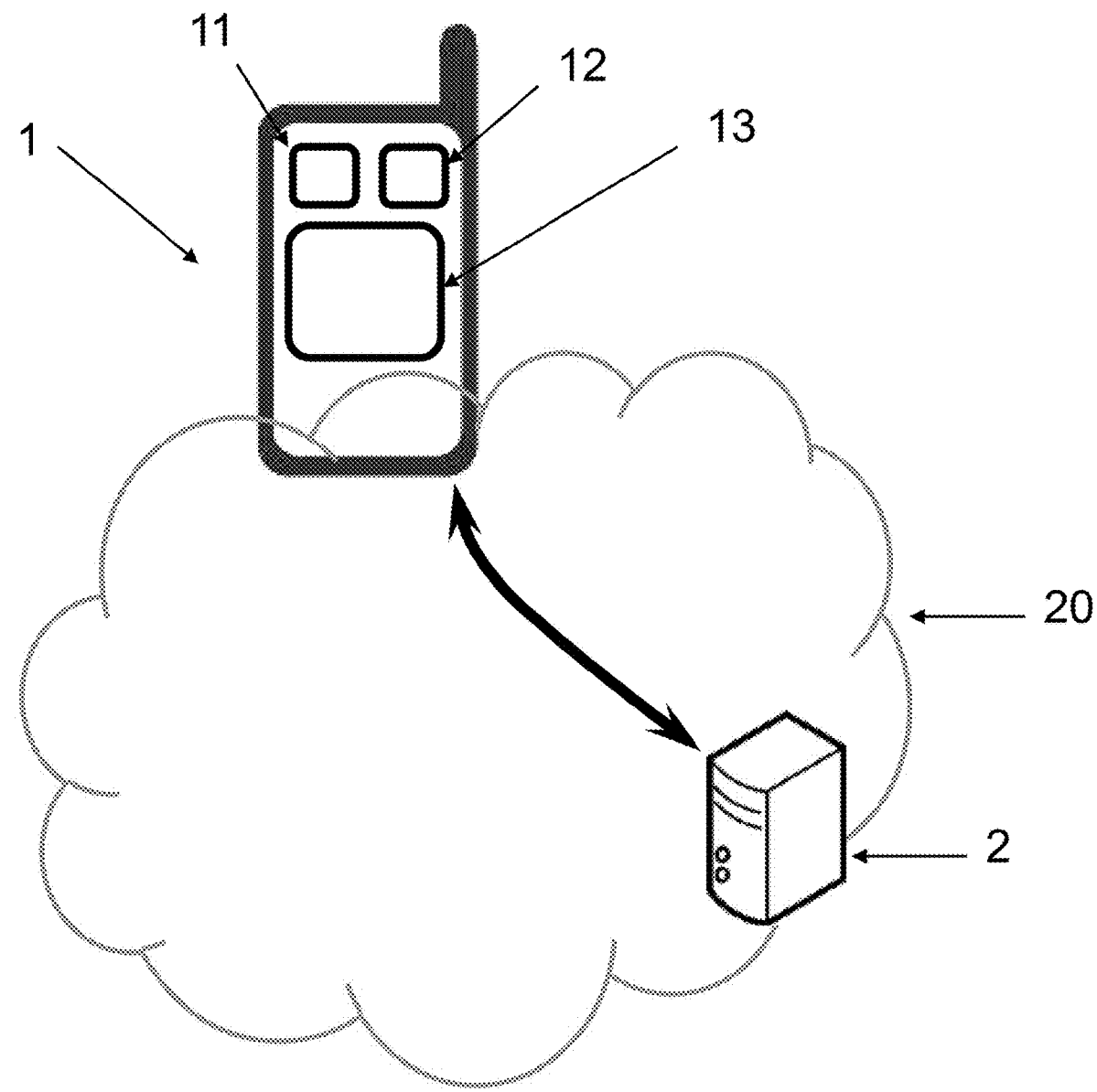
FIG. 1 illustrates an example of architecture in which the method according to the development is performed.

The present development relates to a method for operating a device 1 as represented by FIG. 1. As explained the device comprises a processing unit 11, i.e. a CPU (one or more processors). The device 1 is an electronic device able to handle a phone call, meaning that it typically comprises a user interface 13 including at least an audio input (for instance a microphone) and an audio output (for instance loud speaker). It is to be understand that the device 1 may just comprise a connector for a headset.

The device 1 typically further comprises a memory 12 (for example flash memory) and the user interface 13 generally includes a screen (possibly touch sensitive).

The device 1 also typically comprises a battery for powering the processing unit 11 and other units. The device 1 may further comprise others units such as a location unit for providing location data representative of the position of the device 1 (using for example GPS, network triangulation, etc.), further sensors (such as an acceleration sensor, light sensor, etc.), a communication unit for connecting (in particular wirelessly) the device 1 to a network 20 (for example WiFi, Bluetooth, and preferably a mobile network, in particular a GSM/UMTS/LTE network, see below), etc.

This device 1 is typically a mobile phone, a smartphone, a tablet computer, a laptop, etc. In the following description the example of a smartphone will be used, but the present development is not limited to this embodiment as it is well known that computers can nowadays receive phone calls.

The system also comprises a server 2, connected to the device 1 through the network 20. The server 2 is a "central server" acting as a gateway (i.e. a proxy) between the device 1 and other devices for routing calls.

In the following description, we will use as a preferred embodiment the use of the protocol SIP (Session Initiation Protocol) as signaling protocol for setting up calls. In such a case, the server 2 is able to establish a SIP dialog between calling and called parties, and preferably implements a B2BUA (SIP Back-to-Back User Agent—acting as both a User Agent Client and a User Agent Server). SIP is standardized as RFC 3261.

Receiving a Phone Call

The present method can be implemented by an operating software of the device as handling calls is generally a basic functionality of a device such as a smartphone. Alternatively, the present method can be implemented by a dedicated application such as a "chat" application allowing voice calls and possibly video calls.

Figure 2:
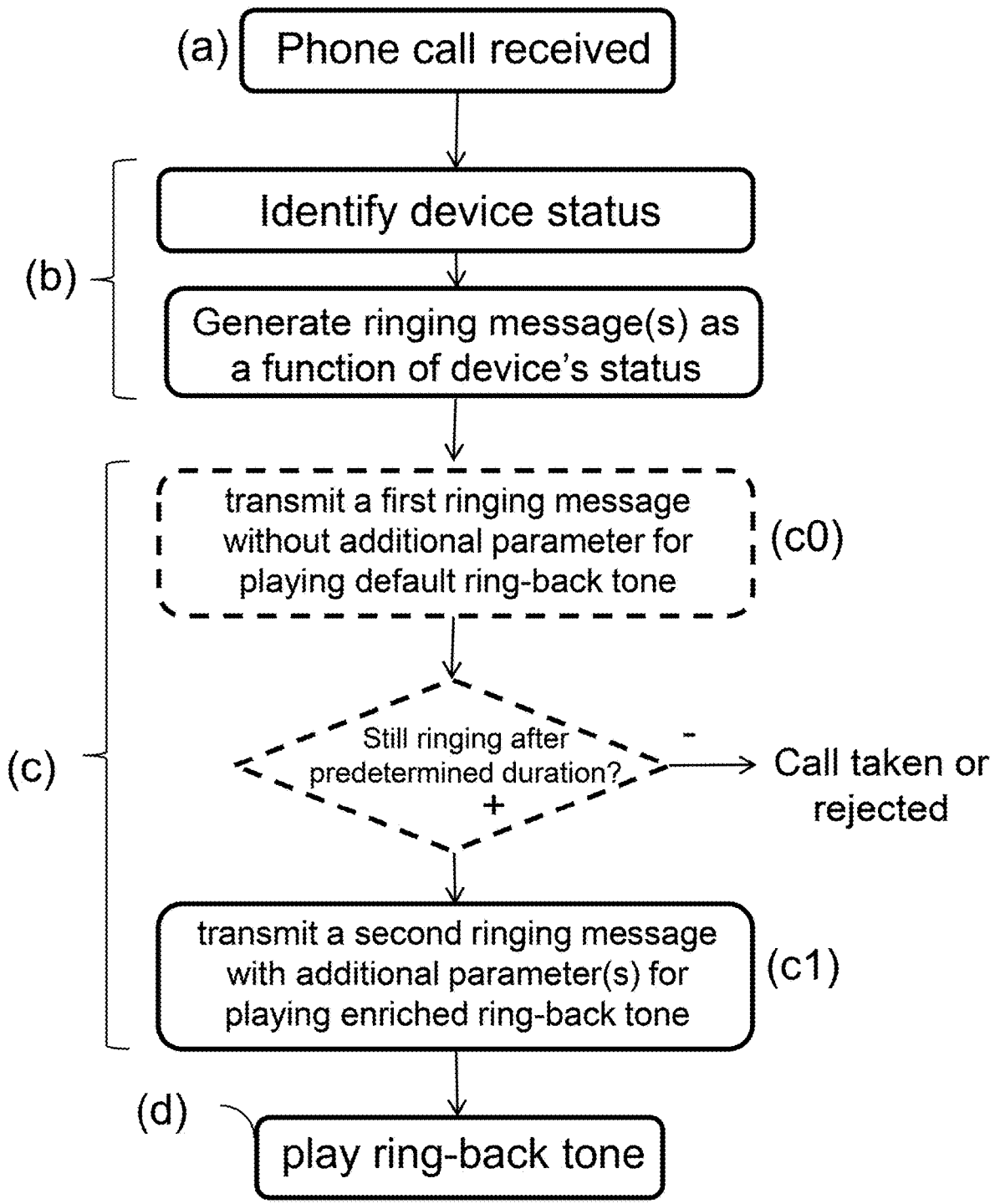
FIG. 2 illustrates an embodiment of the method according to the development.

With reference to FIG. 2, the present method starts with a first step (a), wherein the processing unit 11 receives a message signaling an incoming phone call from a calling party (i.e. the callee being requested to handle this phone call through the user interface 13 of the device 1) via the server 2.

By "receiving a message signaling a phone call", it is meant receiving (in particular from the communication unit of device 1) data for establishing a phone call, i.e. data representative of the intent of the calling party to establish a voice communication between the calling party's device and the called party's device (the device 1). This data generally comprises identity information about the calling party, which may be in particular a caller ID, i.e. the telephone number of the calling party. It is to be understood that the calling party may mask its caller ID, and this absence of caller ID may count as identity information for the present method.

To sum up, step (a) comprises receiving data for establishing a phone call between the calling party's device and device 1, and in some embodiments determining from these data identity information about the calling party. Here, this determination of identity information can be understood as "attempting to identify": either the attempt is successful, meaning there is a caller ID to be found, and this caller ID is the identity information, or this attempt is unsuccessful, meaning that no caller ID can be found, and the identity information is then an indication that no caller ID is available (e.g. the caller ID is masked).

In an embodiment relying on a SIP implementation, the device 1 receives an INVITE request, in order to initiate a dialog for establishing the call.

The device 1 then typically replies by sending a "100 Trying" message to the server 2 in order to provide feedback that the INVITE request is being processed.

In a usual operation mode, the device 1 is "ringing", i.e. it informs the callee through its user interface 13 of the incoming phone call and prompts the callee to decide whether to answer or to reject the call (i.e. to take or not the call). During the ringing, the user interface 13 advantageously displays the identity information of the calling party, for helping the user to decide whether to answer or to reject the phone call. It is generally provided that the device 1 rings during a determined time period, and if the user has not actively answered the call at the expiration of this time period, the call is automatically rejected and forwarded to a voicemail system (for enabling the caller to record a message). In case a "Do not Disturb" mode (or similar modes) is activated, the functioning stays the same, the only difference being that the device 1 is silenced and thus unable to alert the user: the user is therefore not likely to notice the call (and to take it).

In any case, a "180 ringing" message is then sent to the server 2, indicating that the device 1 is trying to alert the callee. Upon reception of such a ringing message, the server 2 shall generate a Ring-Back Tone (RBT), also referred to as "audible ringing", to be played by the caller's device in order to be heard by the calling party.

The Ring-Back Tone informs the calling party that the device 1 is trying to alert the user (by contrast with direct redirection to a voicemail, for example).

However, the RBT is nearly always the same (it is sometimes possible to set a personalized RBT or a music), and does not carry any information on the callee.

From the calling party's point of view, hearing the RBT before being forwarded to the callee's voicemail just means that the called party has not answered the call for some reason. The present development proposes to astutely inform the calling party about this reason in the RBT itself, by enriching this RBT. This way, the calling party will not miss the information, even when calling from a landline phone.

Ringing Message

For instance, the RBT could be enriched with additional information, based on which status the called party's device 1 is on, such as silent mode, do not disturb mode or driving mode, from the settings of the callee's phone, or whether the callee is in meeting (from the callee's calendar).

In other words, when the device 1 receives a call and does not answer immediately, status information available to the device 1 is checked, and then the ring-back tone can be enriched with such a status information.

To this end, in a step (b), the method comprises generating a ringing message comprising at least one additional parameter specifying an enriched ring-back tone to be played, as a function of at least a status information available to said device 1.

Indeed, in a preferred embodiment, the RBT is not directly managed by the device 1, but by the server 2. In the case of SIP, said ringing message is as explained a 180 ringing message, which as explained triggers the playing of the RBT by the server 2.

By "additional parameter specifying an enriched ring-back tone to be played", it is meant a parameter understandable by the server 2 such that, when receiving the ringing message including such an additional parameter, the server will not play a default RBT but an alternative RBT as a function of the message (see below), referred to as "enriched RBT". We will see below examples of such parameters.

By contrast, without said additional parameter in the ringing message (in other words in a default ringing message as already known) the default RBT (different from the enriched RBT, advantageously the ordinary repeated tone) is played. It is to be understood that said enriched RBT preferably recites a piece of information regarding said status information.

In other words, in the present development, by contrast with a default ringing message which does not comprise any additional parameter(s) specifying an enriched ring-back tone to be played, the device 1 generates here an enriched ringing message, containing such additional parameter(s), which can be a dedicated ringing message for transmitting this additional parameter(s), or even a default ringing message where this additional parameter(s) has been inserted in an field of this message which is already defined but not foreseen for such the insertion of such additional parameter(s).

To illustrate this last embodiment, the additional parameter(s) may be advantageously inserted into a "Alert-Info" header field of a 180 ringing message pursuant to the RFC 3261. The Alert-Info header field indeed allows to specify an alternative RBT to a User Agent Client (as is the B2BUA server 2). A typical usage is for a proxy to insert this header field to provide a distinctive ring feature, for example a music, if the user has subscribed to a dedicated service.

In the present development, the ringing message is advantageously dynamically generated, i.e. it depends at least from the status information available to the device 1 at the time of receiving the message signaling an incoming call.

By status information, i.e. meant any information relative to the device 1 or its user which could have an impact on the ability of the callee to take the call. In particular, the status information available to said device 1 preferably comprises a status information of the device 1 and/or information about the availability of a user of said device 1.

In other words, said status information is preferably about a status of the device 1 and/or a status of the user of the device 1.

To this end, step (b) may comprise the previous identification of the status information available to the device 1, in particular among a predetermined list of possible status.

Thus, step (b) may comprise comprises identifying the status of the device 1, in particular among a determined list of possible status for the device 1, and/or determining the availability of the user of said device 1 by accessing a calendar of said user.

In more details, identifying the status information available to the device 1 may typically comprise verifying whether a particular notification mode of the device 1 is set (to identify the status of the device 1) and/or accessing a calendar of the user of the device 1 (to determine the availability of the user of said device 1).

According to a first embodiment, (based on the status of the device 1) the settings of the device 1 are accessed, i.e. it is checked if a particular notification mode (i.e. a mode restricting the notifications, in particular a "Do Not Disturb" mode, "Driving" mode or "Silent" mode) of the device 1 is set. In such an embodiment, the status of the device 1 belongs to the list of status as defined below:
  no particular notification mode;
  Do Not Disturb mode;
  Driving mode;
  Silent mode.

The additional parameter may have as many values as possible statuses, or a value for a group of similar statuses (for example being in the "Do Not Disturb" mode or the "Driving" mode).

The enriched RBT may consequently indicate "the person you are trying to reach is in Do Not Disturb mode".

According to a second embodiment (based on the availability of the user of the device 1), the calendar of the device's user is accessed, i.e. it is checked if at the time the incoming call is received, there is a calendar item (i.e. an appointment) planned, and possibly the type of calendar item (meeting, lunch, etc.).

The enriched RBT may consequently indicate "the person you are trying to reach is currently busy", or even more precisely "the person you are trying to reach is currently in a meeting".

In a particularly advantageous embodiment, in order to determine the availability of the user of said device 1, not only does the processing unit 11 checks if there is a calendar item at the time the incoming call is received by device 1, but it also checks if there is a planned calendar item starting soon after the time the incoming call is received, in other words within a determined time period starting from the incoming call reception (for instance, starting in the next 5 minutes).

Take an example where it is determined that Bob will have a meeting in 5 minutes when Alice calls him (for instance because the calendar module on device 1 replies to the software module of device 1 that the next calendar item occurs at 15:30 while the incoming call is received at 15:25), an enriched RBT with the information "Bob is in a meeting in 5 minutes" could be generated (note that an additional parameter may indicate "how much time is left until the next calendar item"). When Alice receives this information, it is then possible for Alice to try to shorten the duration of the call once Bob has taken the call. Sometimes the callee, Bob in this example, does not remember the next calendar item when he picks up a call. The purpose of this embodiment is to avoid the call lasting too long and impacting the next appointment of the called party.

The status of the device 1 may thus be one of the statuses in the list as defined below:
available;
in a meeting;
having lunch;
about to have a meeting.

According to another embodiment, both the settings of the device 1 and the user's calendar are accessed. Then, possibly, two additional parameters are inserted into the ringing message generated by processing unit 11.

It is to be noted that the status identification is not limited to settings/calendar. In particular the status information (and in particular information about the availability of the user) may be derived from various contextual data such as time data, geolocation data, acceleration data, etc., representative of situations wherein it is known that the user could not be able to take the call. The status could thus be "at work", "running", "sleeping", etc.

For example, it may be provided that when the processing unit 11 detects that device 1 is at a given location (e.g. office) between 9 am and 6 pm, the user's status is "currently at work".

As another example, if the acceleration data show an acceleration continuously above a threshold value, the processing unit 11 may derive that the user's status is "currently running".

Identity Information

The ringing message may be generated only as a function of the status information about the user of said device 1.

Alternatively, the ringing message may also be generated as a function of at least an identity information about the calling party (for example the caller ID/phone number). It means that the way to handle a call and to enrich the RBT may vary depending on the identity of the calling party. In a preferred embodiment, a ringing message comprising at least one additional parameter specifying an enriched ring-back tone to be played is generated only for contacts of the user, else no additional parameter is inserted so as a default RBT is to be played.

Indeed, there might be an issue about privacy, as anyone just calling someone could get some information about the called party's situation in real time. In order to address this issue, users can have a setting in the device 1 to decide if this option is on/off and/or on to whom it applies (contacts, everyone, favorite). The enriched ring back tone is then only sent when the option is on, and to the callers who are allowed by the callee to be informed of the callee's situation.

To this end, step (b) preferably comprises processing said identity information for attempting to identify a contact (in the preferred embodiment, additional parameters(s) are inserted only if a contact has been identified, else a default ringing message—without parameters—is generated, so that the default RBT is played).

Such a processing may simply comprise searching for the identity information in a contact list stored in a memory 12 of the device 1. As already explained, in case there is no caller ID (i.e. a masked call), it is considered that no contact could be identified.

Figure 3:
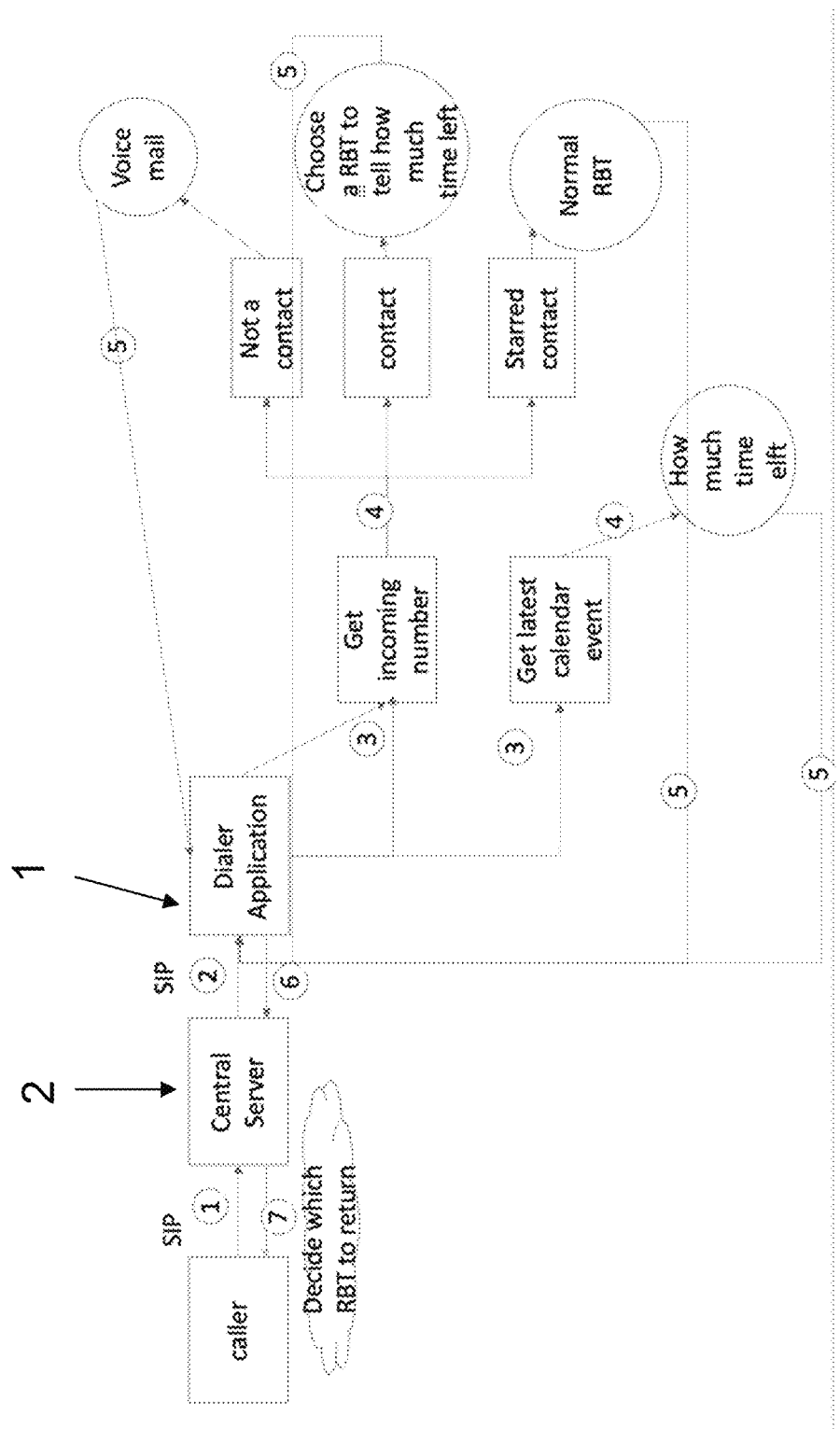
FIG. 3 illustrates another embodiment of the method according to the development.

With reference to FIG. 3, a complex scheme may be used: here up to two additional parameters can be inserted into the ringing message: one "contact" parameter and one "calendar" parameter (in particular the time left before the next appointment).

Note that in a known fashion, the call may be directly rejected without generating any ringing message in some cases (see direct voicemail in FIG. 3 when the calling party is not a contact).

Transmission to the Server

Finally, in a step (c), said ringing message is transmitted to the server 2 for playing to the calling party said enriched ring-back tone.

The server 2 may store a plurality of predetermined enriched RBT (including predefined voice messages such a "the person you are trying to reach is in Do Not Disturb mode", "the person you are trying to reach is currently busy"... ), and just select one as a function of the value from the additional parameter received in the ringing message from the device 1.

If a parameter contains a numerical value X (for example the time is left until the next calendar item), this numerical value X may be inserted into a generic template "the person you are trying to reach will be in a meeting in X minutes". In other words, more generally speaking, after having received such a parameter containing a numerical value X, server 2 generates an enriched ring-back tone (for instance using Text-to-Speech (TTS) technology) in which this numerical value is orally indicated to the calling party.

For example, when device 1 (of the called party) has returned to server 2 a remaining time of X minutes before next event in the device user's agenda, server 2 may then generate a ringtone in which this remaining time X is orally expressed (for instance, a ringtone including a sentence "the callee has a meeting in 10 minutes" when X=10 minutes).

At this stage, the server 2 may play the enriched ring-back tone to the calling party (step d).

In the example of FIG. 3, we have the following scheme:
(1) a message signaling an incoming call is received to the server 2 [SIP INVITE];
(2) this message is forwarded to the device 1 [SIP INVITE];
(3) the dedicated application of the device 1 implementing the method determines identity information about the calling party, and accesses general settings of the device 1 and/or calendar of the user of this device 1;
(4) status information is determined;
(5) the ringing message is generated as a function of the status information;
(6) the ringing message is transmitted to the server 2 [SIP 180 Ringing];
(7) the enriched RBT is played by server 2 to the calling party.

In an embodiment, which is illustrated by FIG. 2, different successive ringing messages can be used.

In particular, before generating and transmitting the above-mentioned ringing message with additional parameter(s), a default ring message (i.e. without such additional parameter(s)) may be sent (step c0) to the server 2 for playing to the calling party a default ring-back tone (i.e. a ring-back tone which is not dynamically enriched as in the development).

The transmission (step c0) of this default ringing message may occur immediately after that the device 1 receives a signaling message from the server 2 to inform it of an incoming call. It triggers a timer of a determined duration (possibly predetermined in advance, for instance 5 seconds) which, when it expires, triggers the transmission (step c1) of the ringing message with additional parameter(s) as described previously. The generation of this enriched ringing message (step b) may also be triggered at the expiration of this determined duration (so that it is only generated when necessary) or may be triggered before, when receiving the signaling message from the server 2, in order to speed up the process once the determined duration has expired.

Having a default ringing message followed by an enriched ringing message allows the enriched RBT to be played only after a determined time period has lapsed (say 5 seconds) from the beginning of the reception of the call by the device 1, without any answer/rejection from the calling party. This avoids sending uselessly an enriched ring back tone to the caller in case the called party is able to take the call in the end.

Device and Computer Program

The present development further proposes a device 1 comprising a user interface 13 and a processing unit 11, adapted for carrying out the method as previously described. This device 1 may also comprise a memory 12, and sensors. This processing unit 11 is configured to implement the following steps, when the device receives a message signaling an incoming phone call from a calling party via a server 2:

Generating a ringing message comprising at least one additional parameter specifying an enriched ring-back tone to be played, as a function of at least a status information available to said device 1;

Transmitting said ringing message to the server 2 for playing to the calling party said enriched ring-back tone (possibly after having transmitted a first ringing message without additional parameter to the server 2 for playing to the calling party said default ring-back tone).

According to a third aspect, the development proposes a system comprising the device 1 according to the second aspect and the server 2 (connected by a network 20).

The server 2 comprises a processing unit 21 configured to implement, when receiving said ringing message, playing the enriched ring-back tone to the calling party.

The present development further proposes a computer program product, comprising code instructions for executing (in particular with a processing unit 11 of the device 1) the previously described method as well as a computer-readable medium (in particular a memory 12 of the device 1), on which is stored a computer program product comprising code instructions for executing said method. In particular, this computer program product may be implemented by the operating system of the device or a dedicated communication application.

The invention claimed is:

1. A method for operating a device, wherein the method is performed by a processing unit of the device and comprises:

receiving a message signaling an incoming phone call from a calling party via a server;

generating a ringing message comprising at least one additional parameter specifying an enriched ring-back tone to be played, as a function of at least a status information available to the device; and transmitting the ringing message to the server for playing to the calling party the enriched ring-back tone, wherein the ring-back tone is different from a default ring-back tone to be played by the server when receiving a default ringing message without the additional parameter, the enriched ring-back tone reciting a piece of information regarding the status information;

the method further comprising, before transmitting the ringing message to the server, transmitting the default ringing message to the server for playing to the calling party the default ring-back tone, and wherein transmitting the ringing message is performed if the device is still ringing at the expiration of a determined duration after the transmission of the default ringing message to the server.

2. The method according to claim 1, wherein the ringing message is a 180 ringing message according to the Session Initiation Protocol, the at least one additional parameter being in particular inserted into an Alert-Info header field of the 180 ringing message.

3. The method according to claim 1, wherein the status information available to the device comprises a status information of the device and wherein generating the ringing message comprises identifying the status of the device, in particular among a determined list of possible status for the device.

4. The method according to claim 3, wherein identifying the status of the device comprises verifying whether a particular notification mode of the device is set.

5. The method according to claim 1, wherein the status information available to the device comprises information about the availability of a user of the device and wherein generating the ringing message comprises determining the availability of the user of the device by accessing a calendar of the user.

6. The method according to claim 5, wherein determining the availability of the user of the device comprises determining how much time is left until the next calendar item of the user, the time left being used as an additional parameter when generating the ringing message.

7. The method according to claim 1, wherein receiving the phone call comprises determining identity information about the calling party, the ringing message being also generated as a function of the identity information.

8. The method according to claim 7, wherein generating the ringing message comprises attempting to identify a contact of a user of the device from the determined identity information, the ringing message comprising at least one additional parameter being generated when succeeding in identifying a contact of the user of the device.

9. The method according to claim 1, comprising, performed by a processing unit of the server, playing the enriched ring-back tone to the calling party.

10. A device comprising a processing unit configured to implement, when the device receives a message signaling an incoming phone call from a calling party via a server:

generating a ringing message comprising at least one additional parameter specifying an enriched ring-back tone to be played, as a function of at least a status information available to the device; and transmitting the ringing message to the server for playing to the calling party the enriched ring-back tone, wherein the ring-back tone is different from a default ring-back tone to be played by the server when receiving a default ringing message without the additional parameter, the enriched ring-back tone reciting a piece of information regarding the status information;

the method further comprising, before transmitting the ringing message to the server, transmitting the default ringing message to the server for playing to the calling party the default ring-back tone, and wherein transmitting the ringing message is performed if the device is still ringing at the expiration of a determined duration after the transmission of the default ringing message to the server.

11. A system comprising a device comprising a processing unit configured to, when the device receives a message signaling an incoming phone call from a calling party via a server:

generate a ringing message comprising at least one additional parameter specifying an enriched ring-back tone to be played, as a function of at least a status information available to the device; and transmit the ringing message to the server for playing to the calling party the enriched ring-back tone;

and wherein the system comprises the server which comprises a processing unit configured, when receiving the ringing message, to play the enriched ring-back tone to the calling party, wherein the ring-back tone is different from a default ring-back tone to be played by the server when receiving a default ringing message without the additional parameter, the enriched ring-back tone reciting a piece of information regarding the status information;

the method further comprising, before transmitting the ringing message to the server, transmitting the default ringing message to the server for playing to the calling party the default ring-back tone, and wherein transmitting the ringing message is performed if the device is still ringing at the expiration of a determined duration after the transmission of the default ringing message to the server.

12. A computer program, embodied on a non-transitory computer-readable medium, comprising code instructions for executing a method for operating a device, wherein the method comprises, performed by a processing unit of the device:

receiving a message signaling an incoming phone call from a calling party via a server;

generating a ringing message comprising at least one additional parameter specifying an enriched ring-back tone to be played, as a function of at least a status information available to the device; and transmitting the ringing message to the server for playing to the calling party the enriched ring-back tone, wherein the ring-back tone is different from a default ring-back tone to be played by the server when receiving a default ringing message without the additional parameter, the enriched ring-back tone reciting a piece of information regarding the status information;

and further comprising, before transmitting the ringing message to the server, transmitting the default ringing message to the server for playing to the calling party the default ring-back tone, and wherein transmitting the ringing message is performed if the device is still ringing at the expiration of a determined duration after the transmission of the default ringing message to the server.

* * * * *